March 29, 1932.  L. A. WILSON  1,851,794
DISPENSING CONTAINER FOR WHIPPED CREAM
Filed Nov. 20, 1929  2 Sheets-Sheet 1
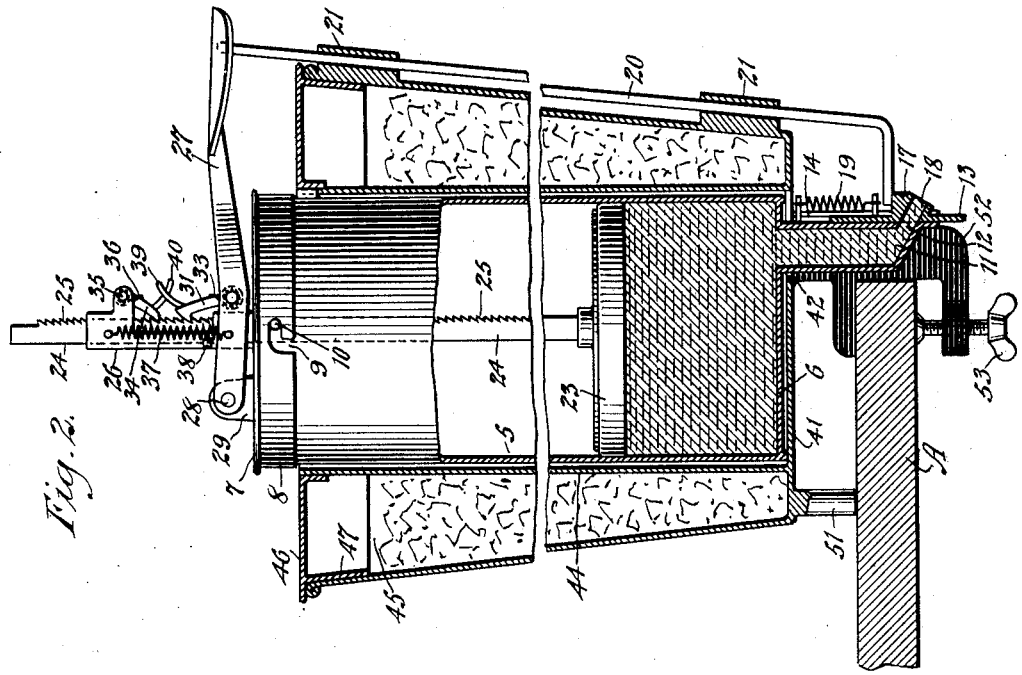
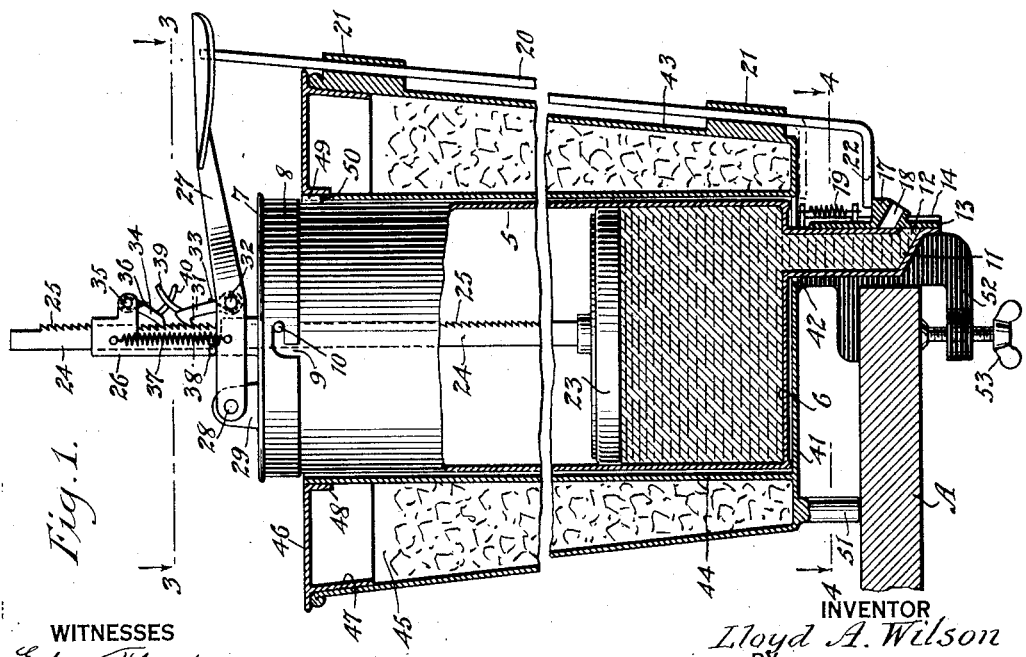
WITNESSES
Edw. Thorpe
Hugh N. Ott
INVENTOR
Lloyd A. Wilson
BY
Munn & Co.
ATTORNEY March 29, 1932.  L. A. WILSON  1,851,794

DISPENSING CONTAINER FOR WHIPPED CREAM

Filed Nov. 20, 1929   2 Sheets-Sheet 2

WITNESSES

INVENTOR
L. A. Wilson
BY
ATTORNEY

Patented Mar. 29, 1932

1,851,794

UNITED STATES PATENT OFFICE

LLOYD A. WILSON, OF NEW YORK, N. Y.

DISPENSING CONTAINER FOR WHIPPED CREAM

Application filed November 20, 1929. Serial No. 408,505.

This invention relates to dispensing containers, and comprehends a container which is particularly designed to hold a quantity of whipped cream and to dispense the same, although it is to be understood that the device is not necessarily restricted to this particular use.

Heretofore, at soda fountains, lunch bars and the like, whipped cream has been handled in a very unsanitary and careless manner, in that it is usually contained in an open vessel and is dispensed by dipping a spoon into the container. Under this method, it is further apparent that there is lack of uniformity as to the quantity dispensed, aside from the fact that considerable waste results, both from the manner of dispensing the cream and from the souring of the same.

The present invention, therefore, aims to overcome the above recited objections and disadvantages by providing a closed sanitary container equipped with means for maintaining the whipped cream at an appropriate temperature to prevent its souring and which further includes means for dispensing a uniform quantity thereof upon each operation of the dispensing mechanism, and this without breaking down or changing the desired texture of the whipped cream.

A further object and advantage of the invention resides in the provision of a whipped cream dispensing container which is constructed in such a manner as to permit of the ready assembly and disassembly of the parts to facilitate their cleansing and sterilization.

As a still further object, the invention contemplates a whipped cream container and dispenser by virtue of which considerable time may be saved in the dispensing of the cream and by virtue of which waste is avoided.

Other objects of the invention reside in the comparative simplicity of construction and mode of operation of the device, the economy with which it may be produced and the general efficiency derived therefrom.

With the above recited and other objects in view, reference is had to the following description and accompanying drawings, in which there is exhibited one example or embodiment of the invention, while the claims define the actual scope of the same.

In the drawings:

Figure 1 is a vertical sectional view through the device with the parts in a non-dispensing position.

Figure 2 is a similar view illustrating the position of parts during the dispensing operation.

Figure 3:
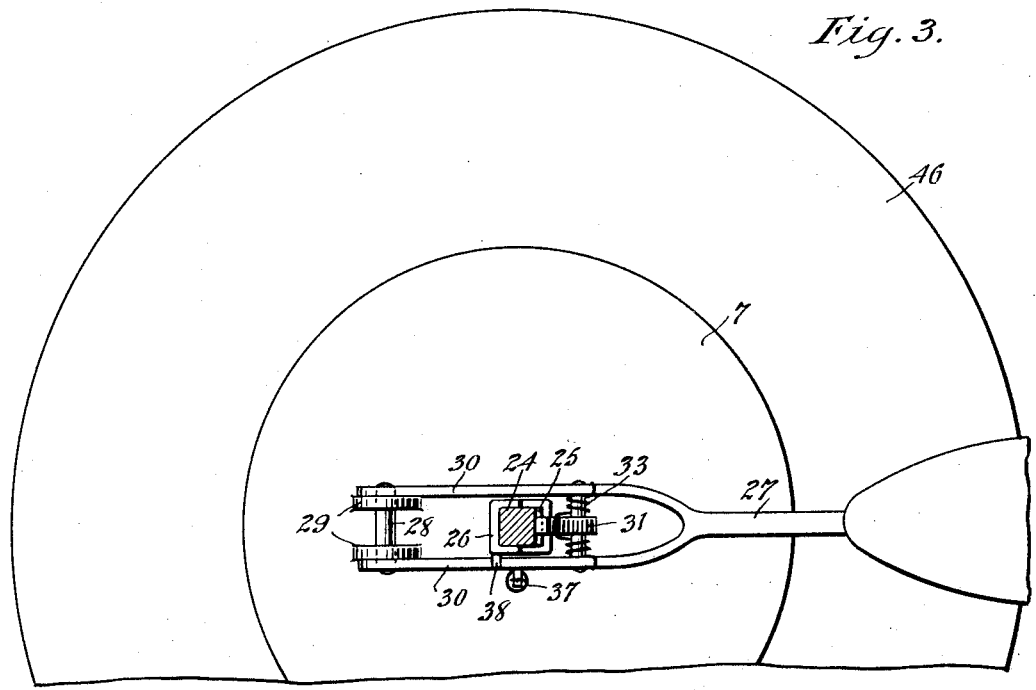
Figure 3 is an enlarged fragmentary horizontal sectional plan view taken approximately on the line indicated at 3—3 in Figure 1.
Figure 4:
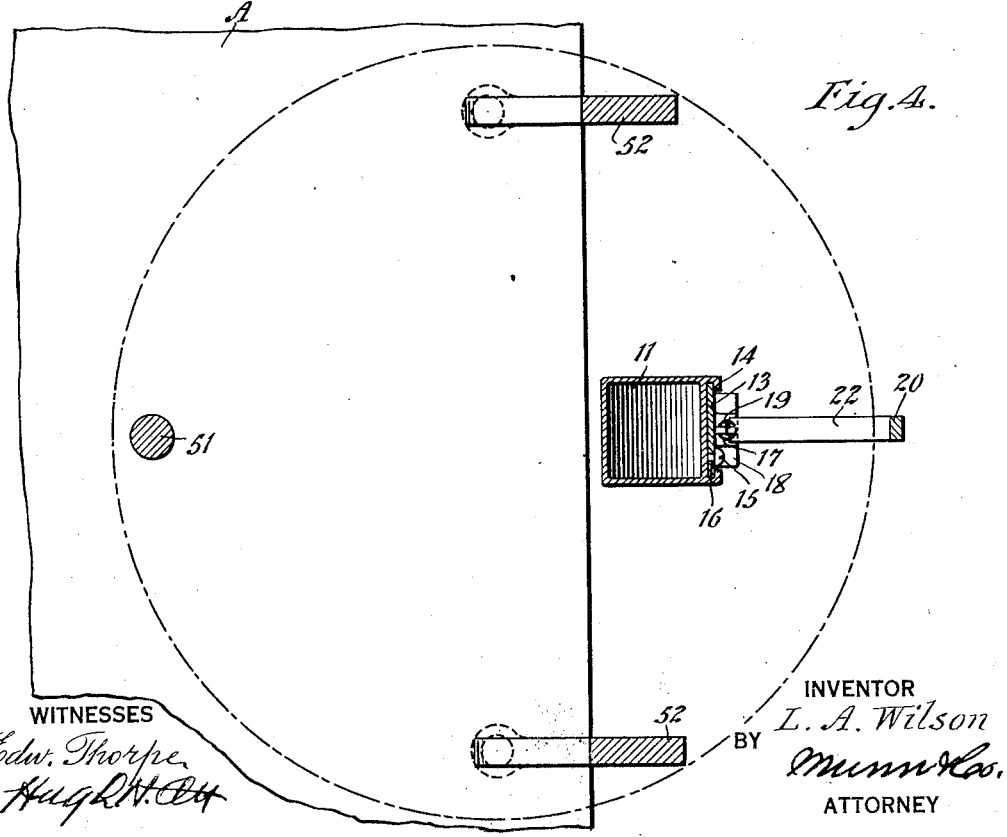
Figure 4 is a similar view taken approximately on the line indicated at 4—4 in Figure 1.

Referring to the drawings by characters of reference, the device includes a container 5 for the whipped cream, which may be of any desired configuration but which is preferably cylindrical, and which is provided with a bottom 6 and an open top closed by a cover 7 which is formed with a depending annular flange 8 having one or more bayonet slots 9 which cooperate with pins 10, whereby the cover is removably secured in place on the upper open end of the container. The bottom wall 6 of the container is provided with a depending outlet nozzle 11 formed with an outlet port 12 on one of its sides adjacent its lower end. A vertically slidable valve is provided for controlling the opening and closing of the outlet port 12, and said valve consists of a plate 13 which is mounted for vertical sliding movement in flanges 14 and which is limited in its sliding movement by a suitable stop screw 15 engaging through a vertical slot 16 in the plate. The plate is formed with an outwardly and downwardly projecting boss 17 through which an outlet opening 18 extends. At the lower limit of its movement, the outlet opening 18 of the valve registers with the outlet port, while at the upper limit of its movement the plate 13 covers the outlet port, and a spring 19 functions to normally move the valve to a closed position. A manipulating rod 20 supported in suitable bearings 21 is provided with an offset lower end 22 engaging with the upper wall of the boss 17 whereby upon depression of the rod 20, the valve is moved to its open position against the action of the spring 19. In order to effect the ejection of the cream from its container, a plunger 23 is mounted for axial movement within the container from its upper end towards its lower or bottom wall 6. The plunger is provided with an upwardly projecting shaft 24 formed on one side with ratchet teeth 25, and said plunger extends upwardly through an upstanding guide 26 which is carried by the cover 7. In practice, the shaft or stem 24 is preferably rectangular in cross section, and the guide 26 is of a corresponding configuration. A common operating lever 27 is employed for simultaneously moving the plunger 23 and the manipulating rod 20 downwardly, and said lever is fulcrumed as at 28 to a bearing ear 29 on the cover 7. In practice, the operating lever is bifurcated, and the furcations 30 thereof straddle the guide 26 and have mounted therebetween an operating pawl 31 which is fulcrumed on a transverse pin 32, and which pawl 31 is urged into engagement with the ratchet teeth 25 of the plunger shaft or stem 24 by means of a suitable spring 33. In order to prevent retrograde movement of the plunger and plunger rod, a locking ratchet pawl 34 is fulcrumed as at 35 to the guide 26, and said locking pawl is urged into engagement with the ratchet teeth 25 of the plunger shaft 24 by a spring 36. As illustrated, the guide 26 is cut away intermediate its ends to expose the toothed portion of the plunger shaft or stem for engagement of the pawls 31 and 34 therewith. A spring 37 functions to normally move the operating lever 27 upwardly until it contacts with a stop element 38 which limits its upward movement. The downward movement of the lever is limited by the limit of the downward movement of the manipulating rod 20 and the complete throw of the operating lever 27 is such as to move the plunger the distance of one tooth 25, which distance will project and dispense approximately a heaping teaspoonful of whipped cream or any other quantity desired. In order to permit the upward movement of the plunger and plunger stem, the pawls 31 and 34 are provided with manipulating fingers 39 and 40 by virtue of which the pawls may be retracted against the action of their springs 33 and 36.

The device further includes a receptacle for receiving and maintaining the container 5 at an appropriate temperature for preventing souring of the cream, and this receptacle includes a bottom wall 41 having an aperture 42 for accommodating the outlet nozzle 11 of the container, to permit of the projection of the same downwardly therethrough. The receptacle further includes an outer wall 43 extending upwardly from its marginal edge and preferably of increasing diameters from its lower end to its upper end. The receptacle further includes an inner wall 44 spaced from the marginal wall and of a cross sectional size and configuration to snugly receive the container 5. This defines between the outer and inner walls 43 and 44 a compartment 45 for ice or any other suitable refrigerant. An annular cover 46 having depending outer and inner marginal flanges 47 and 48 frictionally fits within the upper end of the receptacle between the walls 43 and 44 to close the compartment 45. As illustrated, the manipulating rod bearings 21 are carried by the wall 43. In practice, the container 5 is of slightly greater height than the receptacle, whereby the upper end of the container projects slightly above the cover 46 of the receptacle to facilitate the grasping of said upper end for removing the container from the receptacle. In order to guide the user in properly positioning the container within the receptacle, a key 49 is formed on the container for engagement within a receiving notch 50 at the upper end of the inner wall 44 of the receptacle. Obviously, when the key is brought into alignment with the notch 50, the depending outlet nozzle 11 will properly register with the opening 42 in the bottom wall 41 and the engagement of the key with the notch will hold the container against turning movement in the receptacle. The receptacle and the container may be supported in any suitable manner from a fountain bar, table, shelf or the like A, but by way of illustration, the receptacle, as shown, is provided with a depending leg 51 adapted to rest on the upper surface of the support A and a pair of clamp elements 52 which are adapted to engage over the edge of the support A and to be secured in any suitable manner, such as by the clamping screws 53.

In use and operation, the container 5 is removed from the receptacle and the cover 7 removed from the container. The filled container 5 with the cover 7 applied and with the plunger 23 elevated to a point in contact with the contents, is inserted within the inner wall 44 of the receptacle until the bottom 6 of the container rests on the bottom 41 of the receptacle with the depending outlet nozzle 11 protruding through the opening 42. During the emplacement of the container in the receptacle, the manipulating rod 20 is elevated so that its offset extremity 22 is disposed in an out-of-the-way position until after the boss 17 is passed below the offset 22. When the container 5 has been fully emplaced, it will be observed that the free manipulating end of the operating lever 27 is disposed directly over the upper extremity of the manipulating rod 20, so that depression of the lever 27 operates to approximately move the plunger 23 and the rod 20 downwardly in unison. This registers the outlet opening 18 with the outlet port 12, while the downward movement of the plunger forces outwardly or ejects a predetermined quantity of the contents. It will be observed that the ratchet teeth 25 on the plunger shaft or stem 24 terminate at a point which will insure the discontinuance of the downward feeding movement of the plunger just prior to the time when the plunger would contact with the bottom wall 6 of the container. When this point is reached and it is desired to refill the container 5, it is removed from the receptacle. In order to facilitate the cleansing of the receptacle 5 and its component parts, it is apparent that after removal of the cover 7, the plunger may be separated from the cover and the separated parts may be readily washed, sterilized or otherwise cleansed for further use.

What is claimed is:

1. A dispensing device for whipped cream or the like including in combination, a receptacle having a central container receiving compartment formed with an opening through its bottom and a refrigerant receiving chamber surrounding said central compartment; a whipped cream container including a body removably positioned in said central compartment, a depending outlet nozzle projecting through the opening of the receptacle and formed with a lateral outlet port, a valve carried by the nozzle and normally urged to a position to close the outlet port thereof, a cover for said container body, a plunger having a stem carried by and extending upwardly through the cover, said plunger being mounted within the container body for downward movement to feed the contents through the outlet nozzle, means on the cover engageable with the plunger stem for moving the same downwardly, means carried by the receptacle for opening the valve and a common manipulating element for actuating both of said means.

2. A dispensing device for whipped cream or the like including in combination, a receptacle having a central container receiving compartment formed with an opening through its bottom and a refrigerant receiving chamber surrounding said central compartment; a whipped cream container including a body removably positioned in said central compartment, a depending outlet nozzle projecting through the opening of the receptacle and formed with a lateral outlet port, a valve carried by the nozzle and normally urged to a position to close the outlet port thereof, a cover for said container body, a plunger having a stem carried by and extending upwardly through the cover, said plunger being mounted within the container body for downward movement to feed the contents through the outlet nozzle, means on the cover engageable with the plunger stem for moving the same downwardly, means carried by the receptacle for opening the valve and a common manipulating element carried by the cover for actuating both of said means.

3. A dispensing device for whipped cream or the like including in combination, a receptacle having a central container receiving compartment formed with an opening through its bottom and a refrigerant receiving chamber surrounding said central compartment; a whipped cream container including a body removably positioned in said central compartment, a depending outlet nozzle projecting through the opening of the receptacle and formed with a lateral outlet port, a valve carried by the nozzle and normally urged to a position to close the outlet port thereof, a cover for said container body, a plunger having a stem carried by and extending upwardly through the cover, said plunger being mounted within the container body for downward movement to feed the contents through the outlet nozzle, means on the cover engageable with the plunger stem for moving the same downwardly, a valve opening rod having an offset extremity at its lower end for engaging the valve and a common manipulating element for actuating said means and said rod, said rod being vertically movable to dispose its offset terminal in an out-of-the-way position to disengage and clear the valve when the container is removed from the receptacle.

LLOYD A. WILSON.